United States Patent Office 2,819,539
Patented Jan. 14, 1958

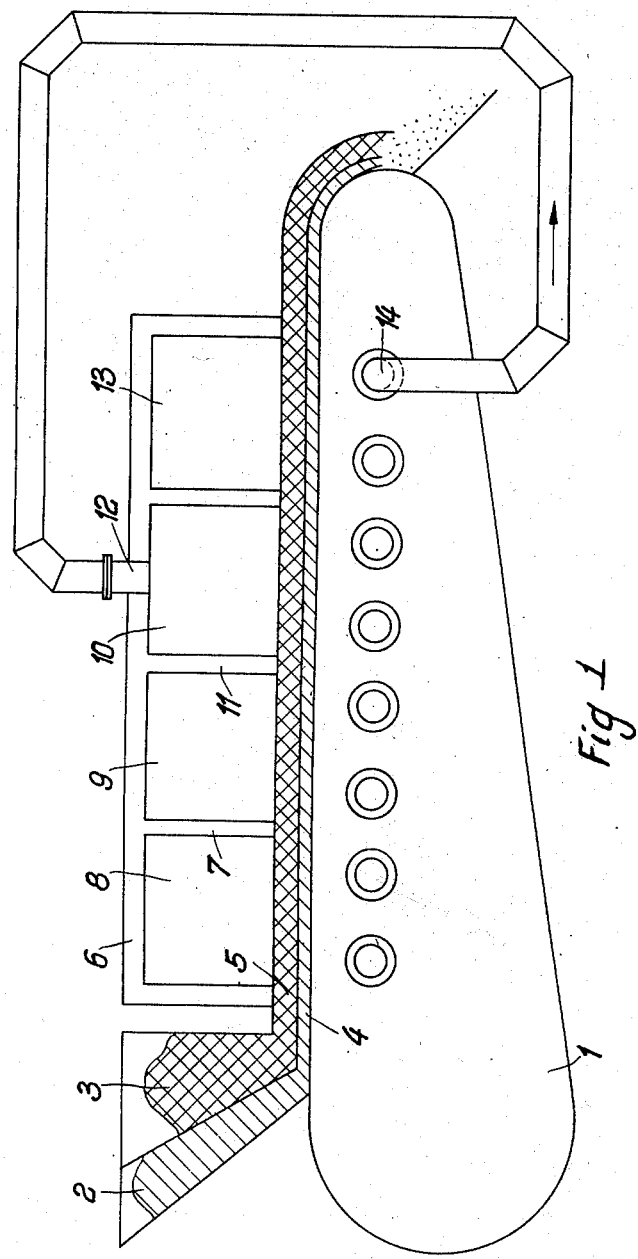

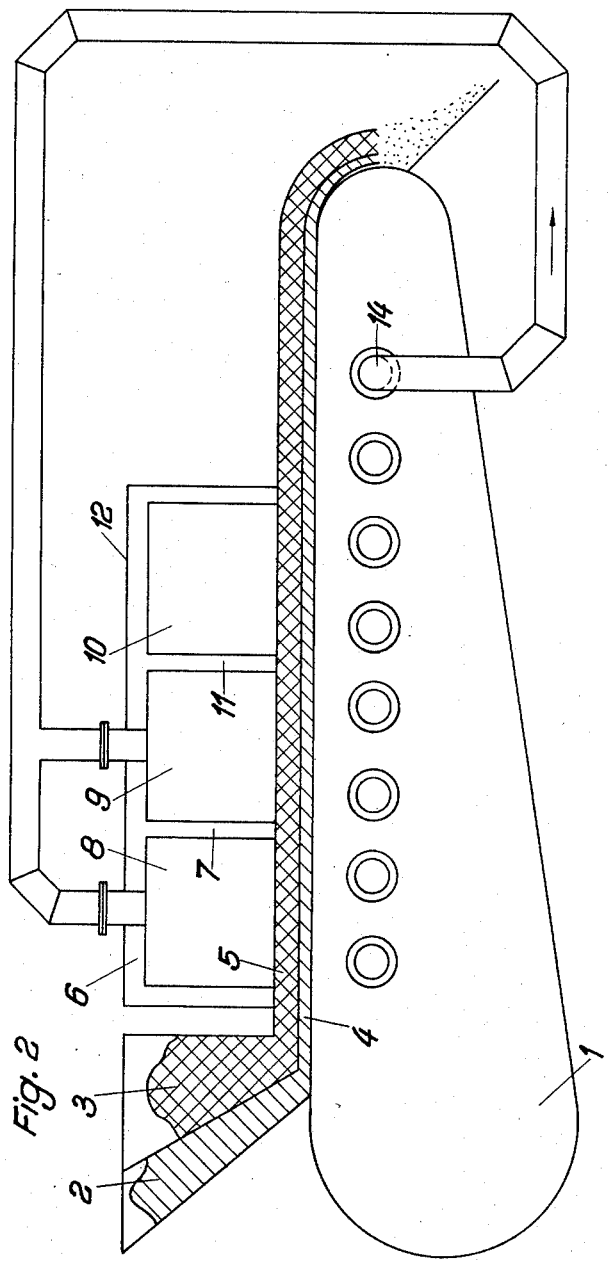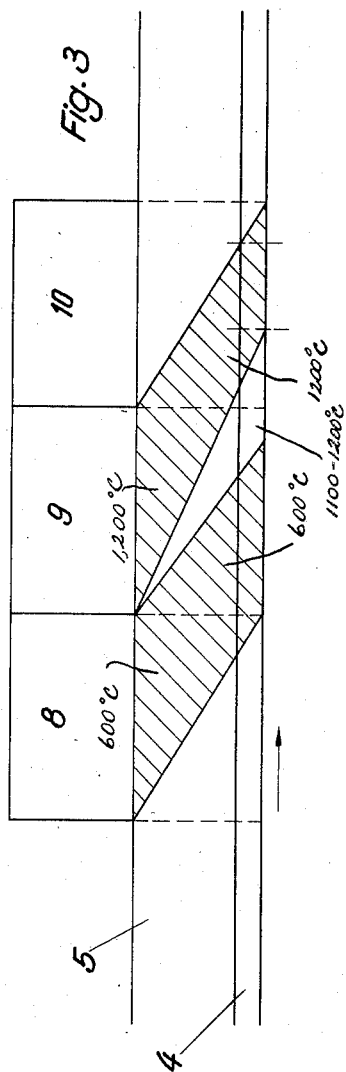

2,819,539

PROCESS FOR TREATING MATERIALS

Hans Rausch and Kurt Meyer, Frankfurt am Main, Germany, assignors to Metallgesellschaft Aktiengesellschaft, Frankfurt am Main, Germany Application May 23, 1955, Serial No. 510,414

12 Claims. (Cl. 34—9)

This invention relates to a process and apparatus for treating materials. In particular, the invention is directed to the treating of granulated materials with hot gases.

It is known in the art to pretreat solid materials with hot gases such as, for example, combustion gases, waste gases of any kind which may be regeneratively, recuperatively or electrically heated, the material being contained upon straight or circular belts, pans, containers or the like. It has also been known to provide various temperature zones along the path the material is conveyed, and in such path to use reaction gases. The time during which the gases contact the material to treat the same can be adjusted by varying the thickness of the layer of material, and/or using negative pressures.

The object of the instant invention is to treat the material with reaction gases in any concentration and purity, and/or at sufficiently high temperature through the layer of material.

In general, this object is accomplished by placing a layer of gas permeable material to be treated upon a movable conveyor and covering this layer of material with a gas permeable granular heat exchange material, the layer being conveyed through a forced draft apparatus in which the gas drawn through the heat exchanger and the material to be treated is composed of air, oxygen, nitrogen, carbonic acid, carbon monoxide, hydrogen, water vapor or other vapors, sulphur dioxide, chlorine, and the like, either taken alone or mixed. The heat exchange material may be composed of spherical or other shaped particles, and can be of a material foreign to that of the material to be treated, such as corundum, mullite, Carborundum or other heat-stable material, and the heat exchange material can be produced partly in the apparatus itself. Preferably, the size or the specific weight of the heat exchange particles differs from that of the material to be treated in order that it can be separated from the treated material after leaving the apparatus, the separation being accomplished by screens, aspirators, or similar means when the heat exchange is carried out in the same apparatus. It is also possible to use heat exchange material in the previously reacted form of the material to be treated, such being in the form which is obtained after treatment, or screened fractions thereof. If pretreated material is used, it can be completely sintered, solidified, or after-burnt by being heated to high temperatures. If the same type of material is being treated as the heat exchange material, which has been only pretreated, the heat exchange material can be separated from the treated material by a dividing or separating sheet metal partition so that the entire charge on the conveyor is discharged into two separate parts. The upper separated layer thus contains the completely sintered and after-treated material, and the lower layer contains the completely treated material, which is then useful to be recycled through the apparatus as an upper layer.

The gases drawn through the material to be treated are heated by means of heat exchange material composed of the same type of material as being treated, or of a foreign material, and this heating can be carried out either in a separate apparatus, for example, in a shaft or the like, or by placing the heat exchange material upon the material to be treated where they are both heated by hot gases. In this second procedure it has been found unexpectedly that the heat exchange material can be heated to the desired temperature, while simultaneously maintaining a lower temperature in the layer underneath it, the material not being damaged by the gases drawn therethrough. It has also been found that it is possible to obtain differences of temperature between the material being treated and the heat exchange material of about 800° C. and more. For example, the heat exchange material can be heated to 1200° C. or more above a temperature of about 600° C. in the material to be treated.

A fundamental advantage of the process of this invention lies in that in this method it is possible to draw gases of any concentration and purity through the material to be treated. For example, in the event that the presence of water vapor or carbon dioxide in the gas would deleteriously affect the material to be treated when drawn therethrough, in accordance with the instant process, it can now be drawn through free of these or other components when heated by means of the heat exchange material. This is of importance, for example, if granules of a hydrate of lime have to be dehydrated at a low temperature. In this case a gas containing carbon dioxide would certainly dehydrate a hydrate of lime, but at the same time carbonize it. According to the instant invention it is possible to heat a gas free of carbon dioxide by means of the heat exchange material, and then draw it through the granules to be treated for dehydration at a temperature of, for example, below 800° C. without danger of carbonizing the material being treated. In addition to regulating the heat of the gases as described, the heat can be regulated by adjusting the thickness of the layer of heat exchange material superimposed upon the material to be treated. Moreover, preheated gas can be drawn through a layer of heat exchange material which has been heated separately, or heated in the process itself. A temperature degree within the material being treated can further be regulated by preheating the material being treated before being put through the process in accordance with this invention. For example, the material to be treated and the heat exchange material can be preheated together in the forced draft apparatus with hot gases or recovered hot gases, then the heat exchange material can be heated by itself to about 1200° C. or more. Then only the gas, or gas mixture, for effecting the reaction, and being either cold or preheated, can be drawn through the hot heat exchange material first and then through the material being treated. The time period necessary to carry out the reaction can also be adjusted by regulating the thickness of the layer of material being treated, and/or the draft force.

Another feature of the invention lies in that after the material has been treated, the drawing of heated gas through the heat exchange material and then the material being treated is stopped, and instead gas is forced first through the material being treated and then the heat exchange material. Consequently, residual heat in the material being treated is carried upwardly, and the heat exchange material is reheated, the thus preheated heat exchange material being available to be recycled through the process. On the other hand, it is also possible to cool the heat exchange material with the treated material and thus recover heat in the form of air, gas, or a mixture of gases.

The means by which the objects of the invention are obtained are described more fully with reference to the accompanying diagrammatic drawings, in which:

Figure 1 is a cross section through an apparatus for use in the process of the invention;

Figure 2 is a modified form of apparatus; and

Figure 3 is a diagrammatic representation of the heat exchange zones as the materials pass through the apparatus.

In Figure 1 there is shown an endless belt forced draft apparatus having an endless belt travelling grate 1. The material to be treated is supplied through a hopper 2, while the heat exchange material is supplied through a separate hopper 3. Thus upon the conveyor 1 there is placed a lower layer 4 of the material being treated, upon which is superimposed an upper layer 5 of heat exchange material. Mounted above conveyor 1 is a hood 6 which has a partition 7 to form a first chamber 8. Successive chambers 9 and 10 are separated by a partition 11.

The operation of this much of the apparatus is aptly described with reference to a chlorodizing roasting of material at temperatures of from 1100° to 1200° C., note Figures 1 and 3. On conveyor grate 1 a layer 4 of granular gas permeable material to be treated is placed. Upon layer 4 is placed a layer 5 of granular heat exchange material. A heating gas enters chamber 8 at a comparatively low temperature, in the present case at about 600° C. This gas is drawn through layer 5 and then through layer 4 by means of suction ducts diagrammatically illustrated. At the same time, conveyor grate 1 is moving from left to right so as to gradually move layers 4 and 5 from beneath chamber 8 to beneath chamber 9. Under chamber 8 the gases are drawn through relatively quickly so that as the layers 4 and 5 leave chamber 8, they are both heated to a temperature of about 600° C. Any small difference in temperature between the temperature of the gas and the temperature of the two layers is herein disregarded as it is inconsequential. However, the border areas of the heated materials are rather sharply defined as shown in Figure 3. Likewise in this figure, the shaded area in layers 4 and 5 beneath chamber 8 is at a temperature of 800° C., whereas the unshaded area is at a much lower temperature ranging from about 100° to 200° C.

Gas at a temperature of about 1200° C. is introduced into chamber 9 and drawn through the two layers. It is thus apparent that the heat exchange material 5 is heated to a temperature to 1200° C., while in the unshaded wedge-shaped section beneath chamber 9, layers 4 and 5 are heated to an intermediate temperature range, this range being in layer 4 from 1100° C. to a temperature approaching 1200° C. At this position the largest portion of the material being treated in layer 4 is at about 600° C. Means are provided for drawing the hot gases from chamber 9 through the materials at a slower rate than they are drawn through from chamber 8. The velocity of conveyor grate 1 and the average velocity of the 1200° C. gas drawn from chamber 9 are so adjusted with respect to each other that at the point where layer 4 passes from beneath chamber 9 to beneath chamber 10, the average temperature is higher than the arithmetical mean between 600° C. and 1200° C. Consequently, when the material in layer 4 enters the space beneath chamber 10, its temperature ranges somewhere between 1100° C. and 1200° C.

It is desired to carry out the chloridizing roasting with hot chlorine at a temperature of from 1100° to 1200° C., but the chlorine must not be contaminated by combustion gases, because the latter contain steam which might interfere with the chlorine reaction. According to the process and apparatus of this invention, the supply of uncontaminated chlorine is accomplished by supplying pure chlorine in either cold or slightly heated form to chamber 10 where it is drawn down through layers 5 and 4. As the chlorine passes through the heat exchange material in layer 5, it is heated up to only 1200° C. and then drawn, still in uncontaminated form, through layer 4. Since layer 4 is already at a minimum temperature of 1100° C., the reaction will take place immediately, and the material of layer 4 is further heated up to 1200° C., this being indicated in the shaded area beneath chamber 10.

Again the velocity of the gas drawn from chamber 10 and the speed of conveyor grate 1 are so adjusted with respect to each other that at the end of section 1 a mixed temperature remains in the materials at a minimum temperature of 1100° C., at which temperature it leaves chamber 10.

In addition to heating the chlorine without it being previously contaminated, the process provides a means of very accurate temperature regulation of the reaction. This is because the material in layer 4 has been preheated to a temperature of 1100° C., and the chlorine has been heated to a temperature of 1200° C. by layer 5, but no more. A temperature limit range is automatically maintained at from 1100° to 1200° C.

In the above description the temperature limits have been given because within these limits an economical process can be maintained. It is also possible to maintain the temperature at a single predetermined value, for example, at 1200° C. All that is necessary is to limit the reaction area beneath chamber 10 to an area at which the material in layer 4 is preheated to 1200° C., as illustrated by the area between the vertical dashed lines beneath chamber 10. Such an accurate regulation of temperature is not needed for many purposes.

In the operation of the apparatus, the hot gases recovered from beneath chamber 8 can be recycled, by means not shown, in the form of preheating gases. This is likewise true for the gases drawn through layers 4 and 5 from chamber 9.

After leaving chamber 10 the layers are moved beneath a subsequent chamber 13. Cold reaction gas, for example, chlorine, can be introduced into chamber 13 and drawn through layers 4 and 5 to be preheated without being contaminated, and then conveyed through duct 14 where it is introduced into chamber 10 through duct 12.

As shown in Figure 2, if it is not desired for any reason to preheat the cold reaction gas by drawing it through the material, chamber 13 can be omitted. Consequently, in place of chamber 13 air is drawn through layers 4 and 5, and the thus preheated air then passed to chambers 8 and 9.

In another form of the process the residual heat in layer 4 can be transferred to the heat exchange material in layer 5 by forcing air upwardly through layer 4 and then through layer 5. Cooled layer 4 is then discharged, and the heat exchange material 5 separated from charge 4 is recycled then to hopper 3. Moreover, when the treated material in layer 4 neither chemically nor physically differs from the material in layer 5, no separation is made. Therefore, only the quantity needed as heat exchange material needs to be transported to hopper 3.

The process is further described by means of the following example:

*Example*

A ground roasted pyrite of the following grain size and composition:

| | Percent |
|---|---|
| +0.1 mm | 3.2 |
| 0.09–0.1 mm | 7.2 |
| 0.06–0.09 mm | 23.2 |
| 0.06 mm | 66.4 |

Contains: 1.84% of zinc and 0.80% of copper

From this roasted product the non-ferrous metals zinc and copper were to be vaporized by adding calcium chloride and heating it by dry air. The residue was to be obtained in the form of pellets ready for being supplied to a shaft furnace.

One-hundred parts by weight of ore were granulated with sixteen parts by weight of commercial calcium chloride with addition of water. The diameter of the granules was from 12 to 15 mm. These granules of material to be treated were placed over a sinter grate forming a layer of 30 cm. in thickness. Over that layer, another layer of 30 cm. in thickness composed of granulated heat exchange material of sintered pellets was placed, having the non-ferrous metals to be distilled therefrom.

The belt carrying these two layers moved underneath a hood 8 where hot gases of 400° C. were drawn through, thus drying and heating the lower layer to 250° to 300° C., and the upper layer to 400 C. In a subsequent section 9 of the hood the upper layer was further heated up to 1100° to 1150° C. Both the quantity and velocity of the gases heating up the heat exchange material was so adjusted that the temperature in the lower layer did not exceed 450° to 500° C., the gases having a temperature of 1150° C.

After the heat carrier had been heated up chemically or physically, dried air was drawn through the materials at an unheated section 10 of the hood. This air was then heated by flowing past the heat exchange material, and it transferred its heat to the cooler portion of the lower layer. Thus the lower layer was heated to 900° to 1000° C., and the non-ferrous metals zinc and copper vaporized in the form of chloride, and they were recovered from the waste gas which was drawn away by a special air pump. By means of regulation of the vacuum the distillation process which is supposed to be carried out within thirty minutes could be adjusted. After the vaporization was completed, the charge was cooled under 13 by drawing normal air therethrough. The waste gas thus obtained had a temperature of 300° to 350° C., and was recycled to the hood section containing the burner and used for adjustment of the temperature.

At the discharge end of the apparatus the upper third of the treated material was separated therefrom by means of a knife in the form of solid pellets, while the remaining portion of the upper layer and the entire lower layer, being freed to a high extent of copper and zinc, was recycled as heat exchange material. The pellets contained about 0.04 to 0.06% zinc and about 0.14 to 0.16% copper. The pellets having been treated in a preliminary process were further solidified by the afterheating when used as heat exchange material in the upper layer.

Having now described the means by which the objects of the invention are obtained, we claim:

1. A process for the hot gas treatment of solid material containing little or no combustible substances, comprising forming a gas permeable layer of the material to be treated at rest upon a movable conveyor in a forced draft apparatus, superimposing a layer of granular heat exchange material which does not react with the treating gas upon the material to be treated, drawing hot gas through the layers of material to preheat at least the heat exchange material while moving the layers through the initial part of the forced draft apparatus, and then drawing relatively cool treating gas first through the heat exchange material to be heated thereby and then through the layer of material to be treated while moving the layers through the following part of the apparatus.

2. A process as in claim 1, said heat exchange material further comprising a material different from the material to be treated.

3. A process as in claim 1, said heat exchanger material further comprising a pretreated form of the material to be treated.

4. A process as in claim 1, said heat exchanger material further comprising a material of greater particle size than that of the material to be treated.

5. A process as in claim 1, said heat exchange material further comprising screened fractions of a pretreated form of the material to be treated.

6. A process as in claim 1, further comprising preheating the treating gas drawn through the layers of material.

7. A process as in claim 1, further comprising simultaneously heating the layers of material.

8. A process as in claim 1, further comprising regulating the heat supplied to the material to be heated by the thickness of the layers of material with respect to each other.

9. A process as in claim 1, further comprising preheating the material to be treated.

10. A process as in claim 1, further comprising regulating the reaction time of the material to be treated by the velocity of the gases drawn through the layers of material.

11. A process as in claim 1, further comprising forcing gas first through the material to be treated and then through the heat exchange material after the reaction of the material to be treated.

12. A process for the heat reaction of solid materials comprising drawing relatively cool uncontaminated retacting gas first through a layer of preheated inert material to raise the gas temperature to that necessary to react the material to be reacted, and then drawing the heated gas through the material to be reacted and so causing the reaction.

References Cited in the file of this patent

UNITED STATES PATENTS

| | | |
|---|---|---|
| 2,119,615 | Wendeborn | June 7, 1938 |
| 2,209,636 | Schubert | July 30, 1940 |

OTHER REFERENCES

Multi-Louvre Dryer Book No. 2409, published by Link-Belt Co., 1952.